United States Patent
Suciu et al.

(10) Patent No.: US 10,590,852 B2
(45) Date of Patent: Mar. 17, 2020

(54) GAS TURBINE ENGINE DUAL TOWERSHAFT ACCESSORY GEARBOX ASSEMBLY WITH A TRANSMISSION

(71) Applicant: United Technologies Corporation, Farmington, CT (US)

(72) Inventors: Gabriel L. Suciu, Glastonbury, CT (US); Hung Duong, Unionville, CT (US); Jonathan F. Zimmitti, Glastonbury, CT (US); William G. Sheridan, Southington, CT (US); Michael E. McCune, Colchester, CT (US); Brian Merry, Andover, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 324 days.

(21) Appl. No.: 15/409,889

(22) Filed: Jan. 19, 2017

(65) Prior Publication Data
US 2018/0202366 A1    Jul. 19, 2018

(51) Int. Cl.
F02C 7/32 (2006.01)
F02C 7/06 (2006.01)
F02C 7/36 (2006.01)

(52) U.S. Cl.
CPC .......... *F02C 7/32* (2013.01); *F02C 7/06* (2013.01); *F02C 7/36* (2013.01); *F05D 2220/76* (2013.01);
(Continued)

(58) Field of Classification Search
CPC .......... F01D 15/08; F01D 15/10; F01D 15/12; F02C 7/32; F02C 7/36; F05D 2220/76; F05D 2220/76
See application file for complete search history.

(56) References Cited

U.S. PATENT DOCUMENTS 4,912,921 A * 4/1990 Rice .......................... F02C 7/32
                                                              244/58
5,867,979 A    2/1999 Newton et al.
(Continued)

FOREIGN PATENT DOCUMENTS

| EP | 2540991    | 1/2013 |
| WO | 2008082335 | 7/2008 |
| WO | 2014046713 | 3/2014 |

OTHER PUBLICATIONS

Dornheim, Michael A., Rolls-Royce Trent 1000 to Drive Boeing 787 Accessories From IP Spool, Aviation Week & Space Technology, Mar. 28, 2005, p. 51, Los Angeles, CA.
(Continued)

*Primary Examiner* — Scott J Walthour
(74) *Attorney, Agent, or Firm* — Carlson, Gaskey & Olds, P.C.

(57) ABSTRACT

A gas turbine engine assembly includes a turbine section having first and second turbines mounted for rotation about a common rotational axis within an engine static structure, first and second turbine shafts coaxial with one another and to which the first and second turbines are respectively operatively mounted, first and second towershafts respectively coupled to the first and second turbine shafts, an accessory drive gearbox mounted to the engine static structure, and a transmission transitionable between a first mode where an electric machine is driven at a first speed relative to the first towershaft, and a second mode where the electric machine is driven at a different, second speed relative to the first towershaft.

18 Claims, 4 Drawing Sheets

(52) U.S. Cl.
CPC .. *F05D 2240/50* (2013.01); *F05D 2260/4031* (2013.01)

(56) References Cited

U.S. PATENT DOCUMENTS

| | | | |
|---|---|---|---|
| 7,500,365 B2 | 3/2009 | Suciu et al. | |
| 7,552,591 B2 | 6/2009 | Bart et al. | |
| 7,698,884 B2 | 4/2010 | Maguire et al. | |
| 7,882,691 B2 | 2/2011 | Lemmers, Jr. et al. | |
| 8,015,828 B2 | 9/2011 | Moniz et al. | |
| 8,347,637 B2 | 1/2013 | Suciu et al. | |
| 8,350,398 B2 | 1/2013 | Butt | |
| 8,511,967 B2 | 8/2013 | Suciu et al. | |
| 8,621,871 B2 | 1/2014 | McCune et al. | |
| 8,814,502 B2 | 8/2014 | Eleftheriou | |
| 2006/0260323 A1* | 11/2006 | Moulebhar | F01D 21/003 60/793 |
| 2006/0272313 A1* | 12/2006 | Eick | F02C 3/107 60/39.63 |
| 2007/0022735 A1 | 2/2007 | Henry et al. | |
| 2007/0130959 A1* | 6/2007 | Linet | F02C 3/113 60/802 |
| 2007/0137219 A1* | 6/2007 | Linet | F02C 3/107 60/802 |
| 2007/0151258 A1* | 7/2007 | Gaines | F02C 7/36 60/792 |
| 2009/0000308 A1* | 1/2009 | Cloft | F02C 7/32 60/802 |
| 2009/0188334 A1* | 7/2009 | Merry | F02C 7/32 74/15.2 |
| 2011/0154827 A1* | 6/2011 | Ress, Jr. | F02C 7/275 60/772 |
| 2013/0051975 A1* | 2/2013 | Makulec | F01D 25/18 415/1 |
| 2013/0071242 A1* | 3/2013 | Caprario | F02C 7/12 415/230 |
| 2013/0098059 A1* | 4/2013 | Suciu | F02C 9/16 60/783 |
| 2013/0145774 A1 | 6/2013 | Duong et al. | |
| 2013/0319240 A1* | 12/2013 | Short | F01D 25/183 95/268 |
| 2014/0020506 A1 | 1/2014 | Duong | |
| 2016/0169118 A1 | 6/2016 | Duong | |

OTHER PUBLICATIONS

U.S. Appl. No. 15/232,101.
U.S. Appl. No. 14/964,984.
U.S. Appl. No. 14/967,446.
U.S. Appl. No. 15/069,197.
U.S. Appl No. 15/269,014.
U.S. Appl. No. 15/373,072.

* cited by examiner

GAS TURBINE ENGINE DUAL TOWERSHAFT ACCESSORY GEARBOX ASSEMBLY WITH A TRANSMISSION

BACKGROUND

This disclosure relates to an accessory drive gearbox for a gas turbine engine.

A gas turbine engine typically includes a fan section, a compressor section, a combustor section, and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A typical gas turbine engine utilizes one or more gearboxes to drive accessory components, such as generators, fuel pumps and oil pumps. Each of the accessory drive components must be driven at a desired rotational speed. As a result, the accessory is coupled to either the low or high speed spool and geared accordingly to obtain the speed at which the accessory operates more efficiently. Thus, it is not uncommon to use one gearbox coupled to the low speed spool to drive lower speed accessory drive components, and use a separate gearbox coupled to the high speed spool to drive the other accessory drive components at a higher speed.

One gearbox has been proposed in which the accessory drive components are driven by a single towershaft. Other gearboxes have been proposed in which some accessory drive components are driven by a first towershaft, and other accessory drive components are driven by a second towershaft.

SUMMARY

A gas turbine engine assembly according to an exemplary aspect of the present disclosure includes, among other things, a turbine section having first and second turbines mounted for rotation about a common rotational axis within an engine static structure, first and second turbine shafts coaxial with one another and to which the first and second turbines are respectively operatively mounted, first and second towershafts respectively coupled to the first and second turbine shafts, an accessory drive gearbox mounted to the engine static structure, the accessory drive gearbox including a first set of gears and a second set of gears, the first towershaft extending into a housing and coupled to the first set of gears, the second towershaft extending into the housing and coupled to the second set of gears, an electric machine, and a transmission coupling the electric machine to the first set of gears, the transmission transitionable between a first mode where the electric machine is driven at a first speed relative to the first towershaft, and a second mode where the electric machine is driven at a different, second speed relative to the first towershaft.

In a further non-limiting embodiment of the foregoing assembly, the first and second turbine shafts are inner and outer shafts, respectively, and the first and second turbines are low and high pressure turbines, respectively.

In a further non-limiting embodiment of any of the foregoing assemblies, the second towershaft is configured to rotate at a higher speed than the first towershaft.

In a further non-limiting embodiment of any of the foregoing assemblies, a first set of accessories are configured to be rotationally driven by the first towershaft through the first set of gears, and a second set of accessories are configured to be rotationally driven by the second towershaft through the second set of gears.

In a further non-limiting embodiment of any of the foregoing assemblies, the first set of accessories includes the electric machine.

In a further non-limiting embodiment of any of the foregoing assemblies, the first set of accessories further includes an oil pump.

In a further non-limiting embodiment of any of the foregoing assemblies, the electric machine is driven at a first speed relative to the oil pump when the transmission in first mode, and the electric machine is driven at a different, second speed relative to the oil pump when the transmission is in the second mode.

In a further non-limiting embodiment of any of the foregoing assemblies, the oil pump is configured to communicate oil to a bearing system including bearings supporting the first turbine shaft.

In a further non-limiting embodiment of any of the foregoing assemblies, the second set of accessories includes at least one of a hydraulic pump, a fuel pump, an air turbine starter, and a permanent magnet alternator.

In a further non-limiting embodiment of any of the foregoing assemblies, the first and second sets of gears include first and second sets of gears respectively coupled to the first and second towershafts, the first set of gears is not in meshing engagement with the second set of gears.

In a further non-limiting embodiment of any of the foregoing assemblies, the first set of gears and the second set of gears arranged within a common housing.

In a further non-limiting embodiment of any of the foregoing assemblies, the electric machine is an integrated drive generator.

A method of driving accessories through an accessory gearbox of a gas turbine engine according to an exemplary aspect of the present disclosure includes, among other things, rotating a first turbine shaft to drive a first towershaft, and rotating a second turbine shaft to drive a second towershaft, the first and second turbine shaft mounted for rotation about a common rotational axis within an engine static structure, driving a first set of gears of an accessory drive gearbox with the first towershaft, and driving a second set of gears of the accessory drive gearbox with the second towershaft, driving a transmission with the first set of gears to rotate an electric machine at a first speed relative to the first towershaft when the transmission is in a first mode, transitioning the transmission to a second mode, and driving the transmission with the first set of gears to rotate the electric machine at a different, second speed relative to the first towershaft.

In a further non-limiting embodiment of the foregoing method, the method includes driving an oil pump with the first set of gears at a first speed relative the first towershaft when the transmission is in the first mode, and when the transmission is in the second mode.

In a further non-limiting embodiment of any of the foregoing methods, the method includes supplying oil to a bearing system with the oil pump, the bearing system including bearings supporting the first turbine shaft, the first turbine shaft configured to drive a fan through a geared architecture such that the fan rotates at a lower speed than the first turbine shaft.

In a further non-limiting embodiment of any of the foregoing methods, the method includes driving at least one of a hydraulic pump, a fuel pump, an air turbine starter, and a permanent magnet alternator with the second set of gears.

In a further non-limiting embodiment of any of the foregoing methods, the first and second turbine shafts are inner and outer shafts, respectively, and the first and second turbines are low and high pressure turbines, respectively.

In a further non-limiting embodiment of any of the foregoing methods, the second towershaft is configured to rotate at a higher speed than the first towershaft.

In a further non-limiting embodiment of any of the foregoing methods, the method includes housing the first and second sets of gears within a common housing of the accessory drive gearbox.

In a further non-limiting embodiment of any of the foregoing methods, the method includes mounting the accessory drive gearbox mounted to the engine static structure.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figures 1, 2:
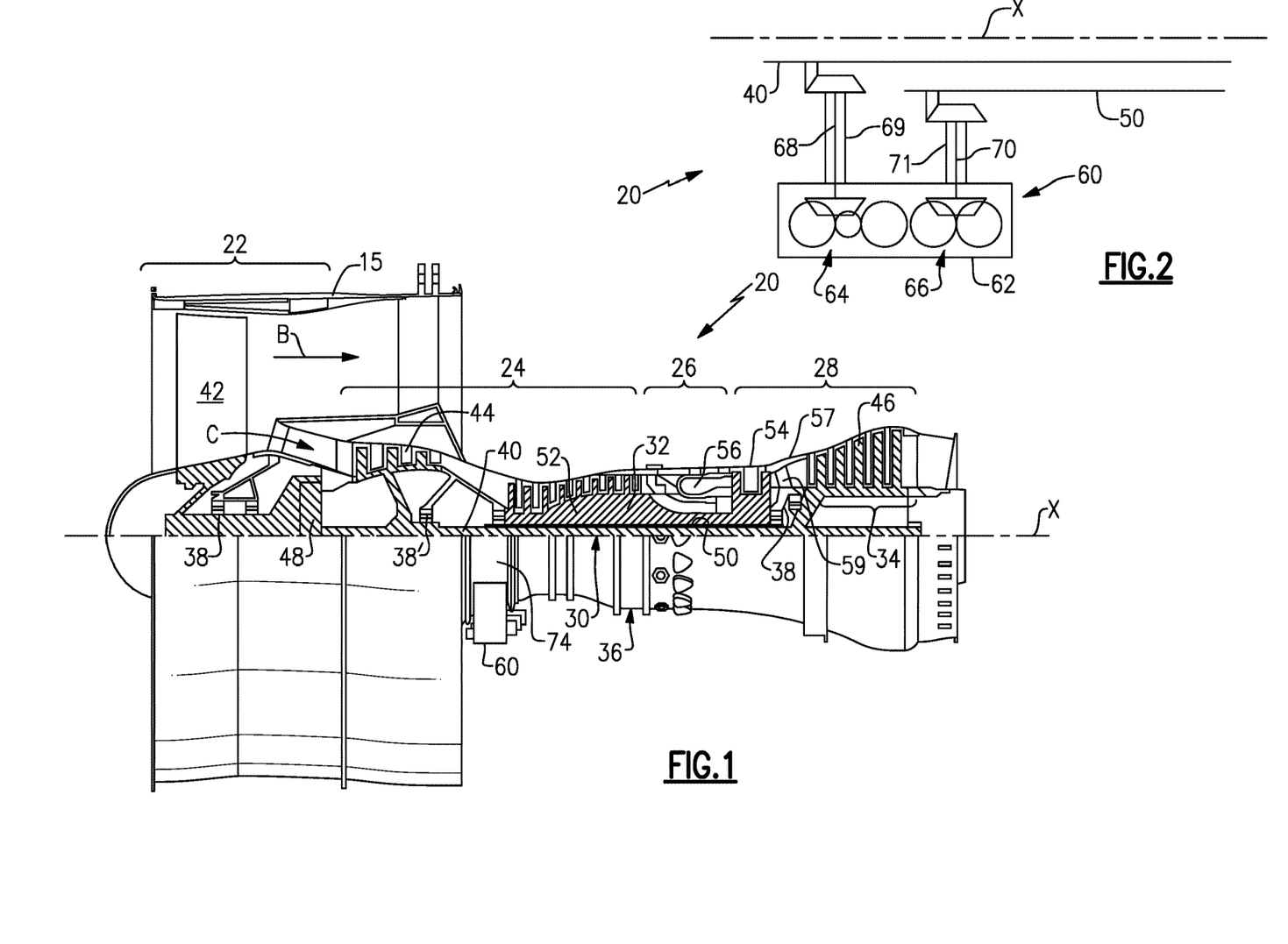
FIG. 1 schematically illustrates a gas turbine engine embodiment.
FIG. 2 is a schematic view illustrating a common accessory drive gearbox driven by both high and low speed spools.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine engine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The gas turbine engine 20 in one example is a high-bypass geared aircraft engine. In a further example, the gas turbine engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,668 meters). The flight condition of 0.8

Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ^\circ \text{ R})/(518.7^\circ \text{ R})]^{0.5}$. The "Low corrected fan tip speed" as disclosed herein according to one non-limiting embodiment is less than about 1150 ft/second (350.5 meters/second).

Referring to FIG. 2 with continuing reference to FIG. 1, the gas turbine engine 20 includes an accessory drive gearbox 60, or gearbox, that is rotationally driven by both the inner and outer shafts 40, 50. The accessory drive gearbox 60 includes a housing 62 within which first and second sets of gears 64, 66 are arranged. A first towershaft 68 extends through a strut 69 to interconnect the inner shaft 40 to the first set of gears 64. The first towershaft 68 can drive the first set of gears 64 through a layshaft, for example. A second towershaft 70 extends through a strut 71 to interconnect the outer shaft 50 to the second set of gears 66. The second towershaft 70 can drive the second set of gears 66 through a layshaft, for example. In another example, the first towershaft 68 could interconnect to the outer shaft 50 and the second towershaft 70 could interconnect to the inner shaft 40.

The example accessory drive gearbox 60 is mounted to, or adjacent to, an intermediate case 74 of the gas turbine engine 20. In some examples, the first and second towershafts 68, 70 extend through the intermediate case 74, and the housing 62 of accessory drive gearbox 60 is mounted to the intermediate case 74. The housing 62 is thus downstream from the first and second towershafts 68, 70 relative to a general direction of flow through the engine 20. The struts 69, 71 can be part of the intermediate case 74 and used to connect the intermediate case 74 to other portions of the gas turbine engine 20.

In some embodiments, the first and second sets of gears 64, 66 are arranged within the housing 62 in close proximity to reduce an overall size of the accessory drive gearbox 60. Sizing the accessory drive gearbox 60 in this way may permit the first and second towershafts 68, 70 to extend through the struts 69, 71 and have the struts 69, 71 directly circumferentially adjacent to each other such that no other strut of the intermediate case 74 is positioned circumferentially between the struts 69, 71. In this example, the first and second sets of gears 64, 66 are arranged in a common housing. Other example could house the first and second sets of gears 64, 66 in separate housings.

Placing the first and second towershafts 68, 70, within adjacent struts on the intermediate case 74 can reduce the effects of thermal expansion differences between the accessory drive gearbox 60 and the gas turbine engine 20. The temperature of the intermediate case 74 can vary in response to the temperature of the engine gaspath, which can change relatively rapidly in response to power settings. The temperature of the accessory drive gearbox 60 is, in contrast to the intermediate case 74, is kept fairly constant by a coolant, such as oil The temperature difference between the intermediate case 74 and the accessory drive gearbox 60 can cause different amounts of thermal expansion. Grouping the first and second towershafts 68, 70 relatively closely together can reduce an overall thermal growth of the accessory drive gearbox 60 relative to the intermediate case 74. Further, packaging space within the nacelle 15 of the gas turbine engine 20 is limited and often not conducive to incorporating multiple, separate accessory drive gearboxes in separate housings.

Figure 3:
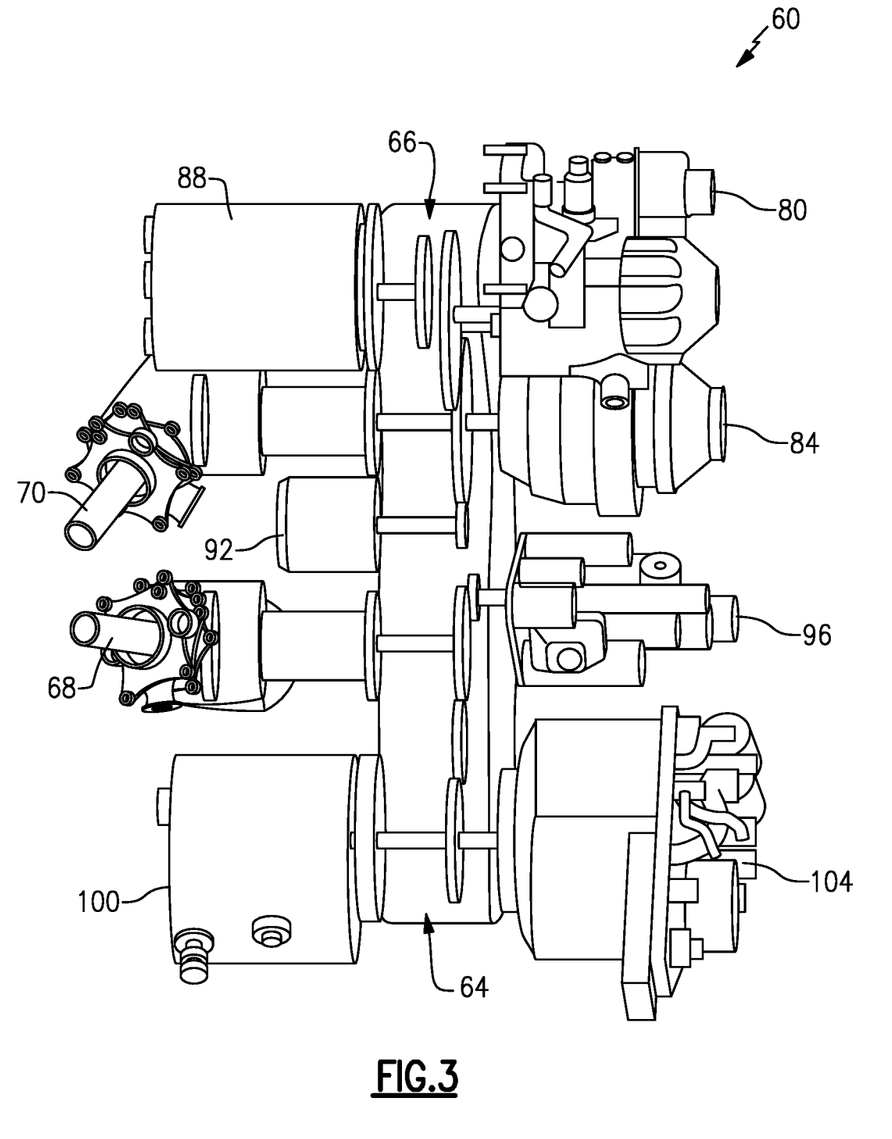
FIG. 3 is a perspective view of the accessory drive gearbox with the accessory drive components mounted thereto.

Referring now to FIG. 3, with continuing reference to FIGS. 1 and 2, the exemplary accessory drive gearbox 60 utilizes the second set of gears 66 to rotatably drive a fuel pump 80, an air turbine starter 84, a hydraulic pump 88, and a permanent magnet alternator 92. The second towershaft 70 is driven by the outer shaft 50 to rotatably drive the second set of gears 66.

The exemplary accessory drive gearbox 60 utilizes the first set of gears 64 to rotatably drive an oil pump 96 and a transmission 100. An electric machine 104 is rotatably driven by the first set of gears 64 through the transmission 100. The first towershaft 68 is driven by the inner shaft 40 to rotatably drive the first set of gears 64.

Figure 4:
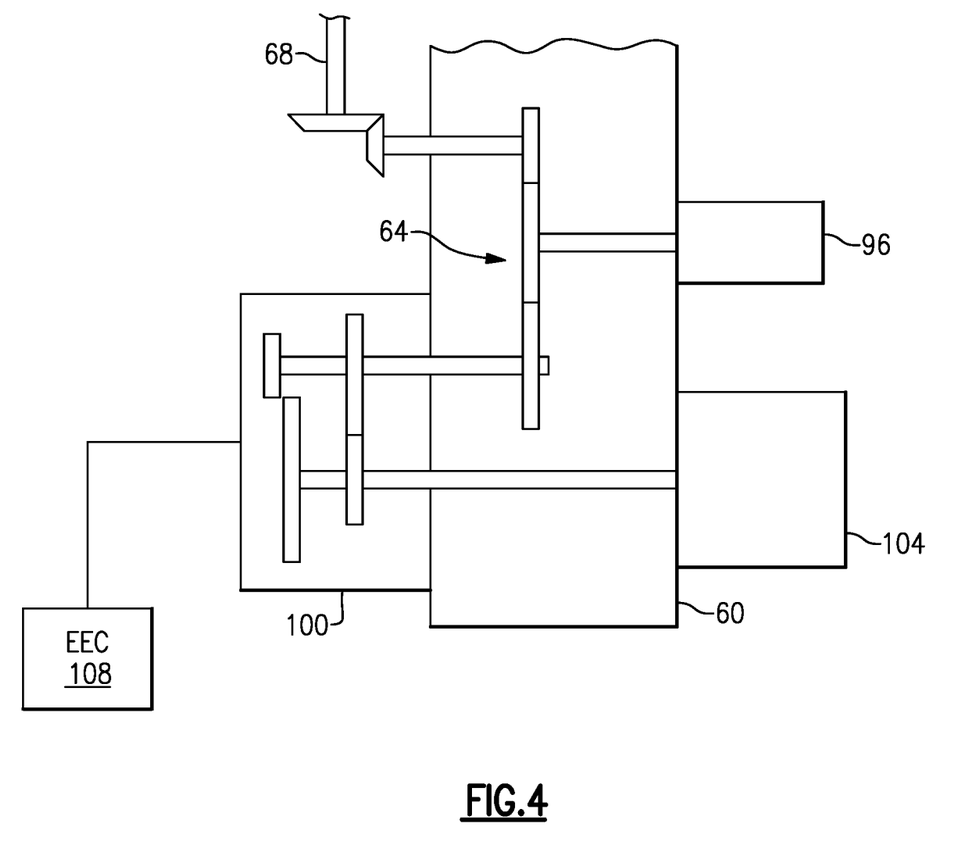
FIG. 4 shows a schematic view of a portion of the accessory drive gearbox of FIG. 3 coupled to an electric machine through a transmission in a first mode.
Figure 5:
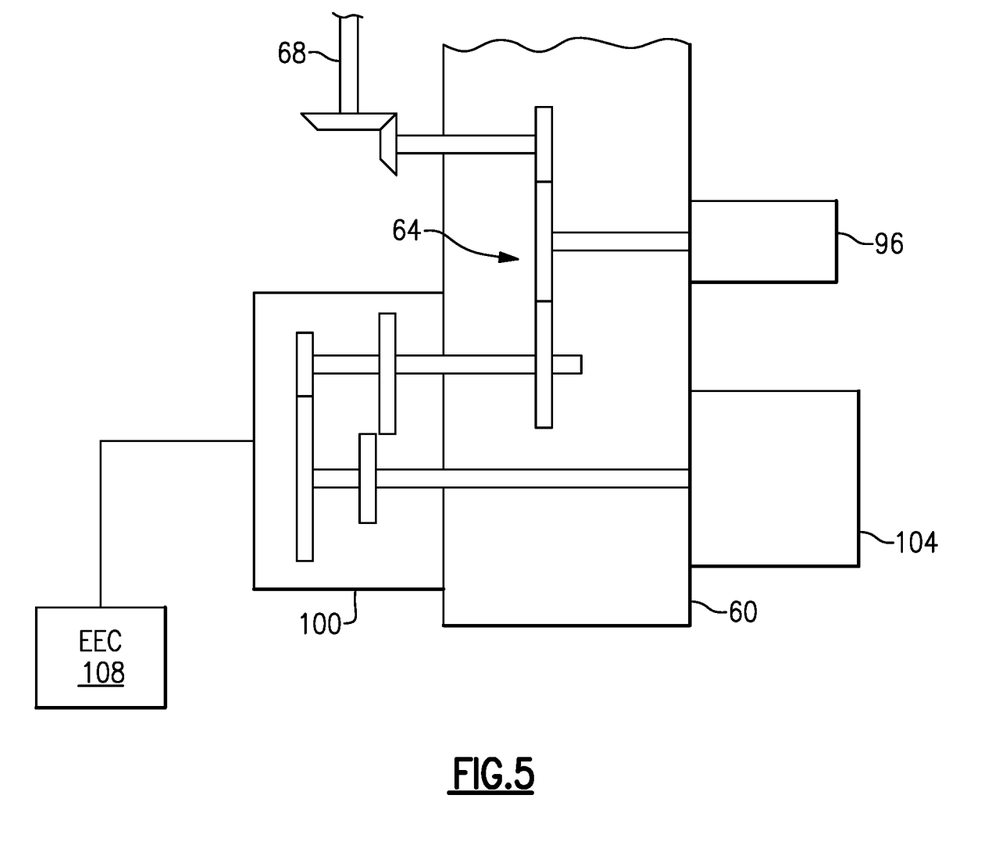
FIG. 5 shows a schematic view of a portion of the accessory drive gearbox of FIG. 3 coupled to the electric machine through a transmission in a second mode.

In an exemplary non-limiting embodiment, the transmission 100 is a two-speed transmission that can transition between a first mode of shown schematically in FIG. 4, and a second mode shown schematically in FIG. 5. In the first mode, the transmission 100 is rotated by the first towershaft 68 through the first set of gears 64 and, in response, rotates the electric machine 104 at a first ratio relative to a rotational speed of the first towershaft 68. In the second mode, the transmission 100 is rotated by the first towershaft 68 through the first set of gears 64 and, in response, rotates the electric machine 104 at a different, second ratio relative to a rotational speed of the first towershaft 68.

During operation, the inner shaft 40 can experience a greater range of rotational speeds that the outer shaft 50. That is, the speed excursion for the inner shaft 40 can be higher than the speed excursion for the outer shaft 50. In a specific non-limiting embodiment, the inner shaft 40 can operate at speed excursions of up to 80% during operation of the gas turbine engine 20, whereas the outer shaft 50 can operate at speed excursions of up to 30% during operation of the gas turbine engine 20.

In this exemplary embodiment, the first towershaft 68 is geared to the inner shaft 40, such that the rotational speed of the first towershaft 68 and the first set of gears 64 varies linearly with the rotational speed of the inner shaft 40. Also, the second towershaft 70 is geared to the outer shaft 50 so that the rotational speed of the second towershaft 70 and the second set of gears 66 varies linearly with the rotational speed of the outer shaft 50.

The transmission 100 addresses issues associated with rotating the electric machine 104 with a rotatable input from the first towershaft 68 from the inner shaft 40. In the exemplary embodiments, the transmission 100 operates in the first mode when the inner shaft 40 is rotating from 0 to 40% speed excursion. If the speed excursion of the inner shaft 40 exceeds 40%, the transmission 100 switches to the second mode to rotate the electric machine 104.

This permits the first set of gears 64 to drive the electric machine 104 through the transmission 100 at two different ratios. The electric machine 104 is thus not required to operate across a range of speed excursions from 0 up to 80% during operation of the gas turbine engine 20. Instead, due to the transmission 100, the range is effectively halved for the electric machine 104. The electric machine 104 can operate more efficiently when the electric machine 104 is rotated across a smaller range of rotational speeds than across a larger range of rotational speeds.

An electronic engine control (EEC) 108 can control the transition of the transmission 100 between the first mode and the second mode. The EEC 108 could, for example, receive an input corresponding to the rotational speed of the inner shaft 40, and then transition the transmission 100 from the first mode to the second mode when the rotational speed exceeds a threshold speed.

In this example, the electric machine 104 is an integrated drive generator that receives a rotational input to generate power utilized by an aircraft. Other examples could incorporate other types of generators, and other types of electric machines. The integrated drive generator is rated at 90 kVA in some examples.

Notably, the oil pump 96 is driven at a fixed ratio relative to the speed of the first towershaft 68. That is, switching the transmission 100 between the first and second modes does not substantially change a ratio of rotational speeds between the first towershaft 68 and the oil pump 96. Thus, as the rotational speed of the first towershaft 68 varies, the rotational input to the oil pump 96 varies linearly with the rotational speed of the first towershaft 68.

In this example, the oil pump 96 is dedicated to supplying oil to the number 1 bearing systems 38', which incorporates thrust bearings directly supporting the inner shaft 40. The thrust bearings are tapered bearings in some examples.

The rotational speed of the first towershaft 68 increases when the rotational speed of the inner shaft 40 increases. The inner shaft 40 may require additional lubrication, such as oil, directed to bearing systems 38 supporting the inner shaft 40 when the rotational speed of the inner shaft 40 increases.

The increased lubrication demands due to increasing the rotational speed of the inner shaft 40 are met by increasing the rotational input speed to the oil pump 96. In other words, the amount of oil moved to the number 1 bearing system 38' varies linearly with the rotational speed of the inner shaft 40. If the oil pump 96 were instead varying linearly with the rotational speed of the outer shaft 50, the oil pump 96 may move more oil than is required for lubrication. The excess oil would need to recirculated, or accommodated in some other way, which results in losses.

The oil pump 96 is considered a 60% oil pump as it accommodates approximately 60% of the lubrication requirements for the gas turbine engine 20. An additional pump, not shown, such as an electric pump, could be incorporated into the engine and powered by the electric machine 104 to supply lubricant to other areas of the gas turbine engine 20.

Referring again to the set of accessories driven by the second set of gears 66, the hydraulic pump 88 is sized to be driven by a rotational input corresponding to speed of the outer shaft 50. The hydraulic pump 88 generally moves hydraulic fluid needed to move components of an air frame to which the gas turbine engine 20 is mounted.

The fuel pump 80 is utilized to supply fuel to the gas turbine engine 20 during start-up, and during other stages of operation. Thus, the fuel pump 80 is driven by rotation from the outer shaft 50. The outer shaft 50 spins up as the engine is started prior to the inner shaft 40. That is, rotation of the low speed spool 30 lags rotation of the high speed spool 32. Thus, pumping fuel with the fuel pump 80 is required during initial rotation of the outer shaft 50.

Similarly, the air turbine starter 84 is utilized during start-up and thus configured to be driven by the outer shaft 50. Also, the permanent magnet alternator 92 can be used to power a full authority digital electronics control (FADEC), which can include the EEC 108. As the FADEC is used during start up, the permanent magnet alternator 92 is also driven by the outer shaft 50.

Referring again to the oil pump 96, an added feature of coupling rotation of the oil pump 96 with rotation of the inner shaft 40 is that the inner shaft 40 spins with the fan 42. Thus, during a windmilling event when the fan 42 is spinning without being driven by the inner shaft 40, the oil pump 96 can continue to pump oil lubricating the bearings associated with the inner shaft 40. If the oil pump 96 were decoupled from rotation with the inner shaft 40, another pump or an electronic pump could be required to move oil to lubricate the fan 42 when windmilling.

Features of some of the disclosed examples include driving accessory components with the low speed spool of a gas turbine engine rather than a high speed spool. This can reduce power draw on the high spool and thereby reduce an exhaust gas temperature. The low speed spool can also work without rotation of the high speed spool, which can facilitate powering some accessory components, such as an oil pump, when the engine is windmilling.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method of driving accessories through an accessory drive gearbox of a gas turbine engine, comprising:
   rotating a first turbine shaft to drive a first towershaft, and rotating a second turbine shaft to drive a second towershaft, the first and second turbine shafts mounted for rotation about a common rotational axis within an engine static structure;
   driving a first set of gears of the accessory drive gearbox with the first towershaft, and driving a second set of gears of the accessory drive gearbox with the second towershaft;
   driving a transmission with the first set of gears to rotate an electric machine at a first speed relative to the first towershaft when the transmission is in a first mode;
   transitioning the transmission to a second mode;
   driving the transmission with the first set of gears to rotate the electric machine at a different, second speed relative to the first towershaft in the second mode;
   housing the first and second sets of gears within a common housing of the accessory drive gearbox;
   driving an oil pump with the first set of gears at a third speed relative to the first towershaft when the transmission is in the first mode, and driving the oil pump with the first set of gears at the third speed relative to the first towershaft when the transmission is in the second mode, and wherein the oil pump is driven at a fixed ratio relative to the speed of the first towershaft in both the first and second modes;

communicating a supply of oil to a bearing system with the oil pump, the oil pump being dedicated to communicating oil to the bearing system, the bearing system including a bearing supporting the first turbine shaft at a position axially forward of the accessory drive gearbox relative to the common rotation axis;

wherein the engine static structure includes an intermediate case surrounding a core flow path defined along a compressor section driven by a turbine section, the accessory drive gearbox is mounted to the intermediate case, the intermediate case includes a first strut and a second strut directly circumferentially adjacent to the first strut with respect to the common rotational axis, the first towershaft extends through the first strut, and the second towershaft extends through the second strut; and wherein the first and second turbine shafts are inner and outer shafts, respectively, the turbine section includes a first turbine and a second turbine, and the first and second turbines are low and high pressure turbines, respectively.

2. The method of claim 1, wherein the first turbine shaft is configured to drive a fan through a geared architecture such that the fan rotates at a lower speed than the first turbine shaft.

3. The method of claim 1, further comprising driving at least one of a hydraulic pump, a fuel pump, or a permanent magnet alternator with the second set of gears.

4. The method of claim 1, wherein the second towershaft is configured to rotate at a higher speed than the first towershaft.

5. The method of claim 2, wherein the step of supplying oil to the bearing system with the oil pump occurs during a windmilling event.

6. The method of claim 3, further comprising coupling an air turbine starter to the second towershaft via the second set of gears.

7. A gas turbine engine assembly comprising:
a turbine section having a first turbine and a second turbine, the first and second turbines mounted for rotation about a common rotational axis within an engine static structure;
a first turbine shaft arranged coaxially with a second turbine shaft, wherein the first turbine is operatively mounted to the first turbine shaft, and the second turbine is operatively mounted to the second turbine shaft;
a first towershaft coupled to the first turbine shaft and a second towershaft coupled to the second turbine shaft;
an accessory drive gearbox mounted to the engine static structure, the accessory drive gearbox including a common housing, a first set of gears and a second set of gears arranged within the common housing, the first towershaft extending into the common housing and coupled to the first set of gears, the second towershaft extending into the common housing and coupled to the second set of gears;
an electric machine; and
a transmission coupling the electric machine to the first set of gears, the transmission transitionable between a first mode where the electric machine is driven at a first speed relative to the first towershaft in operation, and a second mode where the electric machine is driven at a different, second speed relative to the first towershaft in operation; and wherein the engine static structure includes an intermediate case surrounding a core flow path defined along a compressor section driven by the turbine section, the accessory drive gearbox is mounted to the intermediate case, the intermediate case includes a first strut and a second strut directly circumferentially adjacent to the first strut with respect to the common rotational axis, the first towershaft extends through the first strut, and the second towershaft extends through the second strut;

wherein the first and second turbine shafts are inner and outer shafts, respectively, and the first and second turbines are low and high pressure turbines, respectively;

wherein a first set of accessories are configured to be rotationally driven by the first towershaft through the first set of gears, the first set of accessories including the electric machine and an oil pump; and wherein the oil pump is dedicated to communicate oil to a bearing system including a bearing supporting the first turbine shaft at a position axially forward of the accessory drive gearbox relative to the common rotational axis, and the oil pump is driven at a fixed ration relative to a speed of the first towershaft in both the first and second modes.

8. The gas turbine engine assembly of claim 7, wherein the second towershaft is configured to rotate at a higher speed than the first towershaft.

9. The gas turbine engine assembly of claim 7, wherein a second set of accessories are configured to be rotationally driven by the second towershaft through the second set of gears.

10. The gas turbine engine assembly of claim 9, wherein:
the second towershaft is configured to rotate at a higher speed than the first towershaft; and
the first set of gears is not in meshing engagement with the second set of gears.

11. The gas turbine engine assembly of claim 10, further comprising:
an air turbine starter coupled to the second towershaft via the second set of gears;
wherein the second set of accessories includes a hydraulic pump, a fuel pump, and a permanent magnet alternator; and
wherein the electric machine is an integrated drive generator.

12. The gas turbine engine assembly of claim 10, wherein:
the first turbine shaft drives a fan through a geared architecture such that the fan rotates at a lower speed than the first turbine shaft; and
the oil pump is configured to communicate oil to the bearing system in response to rotation of the fan during a windmilling event.

13. The gas turbine engine assembly of claim 12, wherein the bearing is a thrust bearing.

14. The gas turbine engine assembly of claim 9, wherein the electric machine is driven at a third speed relative to the oil pump when the transmission is in the first mode, and the electric machine is driven at a different, fourth speed relative to the oil pump when the transmission is in the second mode.

15. The gas turbine engine assembly of claim 9, wherein the second set of accessories includes at least one of a hydraulic pump, a fuel pump, or a permanent magnet alternator.

16. The gas turbine engine assembly of claim 15, further comprising an air turbine starter coupled to the second towershaft via the second set of gears.

17. The gas turbine engine assembly of claim 7, wherein the first set of gears is not in meshing engagement with the second set of gears.

18. The gas turbine engine assembly of claim 7, wherein the electric machine is an integrated drive generator.

\* \* \* \* \*